(12) United States Patent
Hsiao

(10) Patent No.: US 6,915,699 B2
(45) Date of Patent: Jul. 12, 2005

(54) VERIFICATION SYSTEM AND METHOD FOR VERIFYING THE ASSEMBLY OF DEVICES

(75) Inventor: Keng-Ming Hsiao, Taipei Hsien (TW)

(73) Assignee: Wistron Corporation, Hsi-Chih (TW)

( * ) Notice: Subject to any disclaimer, the term of this patent is extended or adjusted under 35 U.S.C. 154(b) by 51 days.

(21) Appl. No.: 10/707,030

(22) Filed: Nov. 17, 2003

(65) Prior Publication Data

US 2005/0039538 A1 Feb. 24, 2005

(30) Foreign Application Priority Data

Aug. 20, 2003 (TW) .......................... 92122821 A

(51) Int. Cl.⁷ .............................................. G01L 1/00
(52) U.S. Cl. ............................................... 73/760
(58) Field of Search .................. 73/760, 763–65, 73/767, 488, 493, 510, 514.35; 33/365, 366.11, 366.12; 29/592.1, 593

(56) References Cited

U.S. PATENT DOCUMENTS 6,122,538 A * 9/2000 Sliwa et al. ................. 600/407
6,276,203 B1 * 8/2001 Hulsing, II ............... 73/504.03

* cited by examiner

Primary Examiner—Edward Lefkowitz
Assistant Examiner—Corey D. Mack
(74) Attorney, Agent, or Firm—Winston Hsu

(57) ABSTRACT

A method includes disposing a first accelerometer on a verification point of a first device, disposing a second accelerometer on a first flat, measuring components of the force of gravity of the first accelerometer and the second accelerometer in the directions of detecting axes of the first accelerometer and the second accelerometer respectively, and determining whether the assembly of the first device is successful according to the measurements of the two accelerometers.

14 Claims, 6 Drawing Sheets

VERIFICATION SYSTEM AND METHOD FOR VERIFYING THE ASSEMBLY OF DEVICES

BACKGROUND OF INVENTION

1. Field of the Invention

The present invention relates to the field of thermal verification system, and more particular to a method and an apparatus for verifying the assembly of apparatus and related angle between flats by disposing an accelerometer.

2. Description of the Prior Art

In modern times, the thermal solutions are extremely important in computing systems because of the increase of power consumption and related heat generated by faster computing systems. If failure to properly handle the thermal problem, it could result in unstable system behavior or even destruction to critical components.

A heat sink, also called a thermal module, is the base of most thermal solutions no matter if the thermal solution is active or passive. Not only in the design phase must a heat sink be designed and tested with care, but also assembly on the production line must be well controlled to have the thermal solution work properly to avoid thermal problems. In the design phase, there are many tools for helping thermal engineers to design and verify performance of thermal modules. However, there is no efficient way to check if a thermal module is installed properly in the production line. If the thermal module is not installed properly, the expected performance of the thermal module will not be achieved, and all the effort in designing the thermal module is in vain.

Currently, most of the checking methods need to run some specific program on the equipment-under-test (EUT) for a certain period and then read the thermal sensor of the EUT. The system performs an examining program P1 for a predetermined period D1, and measures the temperature of the EUT or the temperature in the computer case. If the measured temperature T1 is lower than a predetermined temperature T2, then it is recognized that the performance of the heat sink meets specification; otherwise, the performance of the heat sink is inadequate and the assembly of the heat sink must be adjusted and the testing has to be executed again. The examining program P1 is purposely designed for the processor to increase its operating temperature. The predetermined examining period D1 is usually quite long, such as 30 minutes for example. Such a long examining period is a heavy burden to the quality control of products. If the heat sink does not pass the test and has to be installed again, then it will cost another 30 minutes to examine the adjusted assembly of the heat sink. Besides, this conventional testing method is not capable of excluding the effect of ambient temperature, and when utilizing the same heat sink in different systems, the examining program has to be re-designed for the specific system. These flaws decrease the efficiency and the accuracy of the quality control of heat sink installation.

SUMMARY OF INVENTION

It is therefore a primary objective of the claimed invention to provide a verification system and a related method for verifying the assembly of devices.

Briefly described, the claimed invention discloses a verification system for verifying the assembly of a first device. The verification system comprises a first accelerometer disposed on a first flat, a second accelerometer disposed on a verification point of the first device, and a remote system capable of comparing outputs of the two accelerometers to determine whether the assembly of the first device is successful.

The claimed invention further discloses a method for verifying whether the assembly of a first device is successful. The method comprises disposing a first accelerometer on a verification point of the first device, disposing a second accelerometer on a first flat, measuring components of the force of gravity on the first accelerometer and the second accelerometer in the direction of a detecting axes of the first accelerometer and the second accelerometer respectively, and determining whether the assembly of the first device is successful according to the measurements of the two accelerometers.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
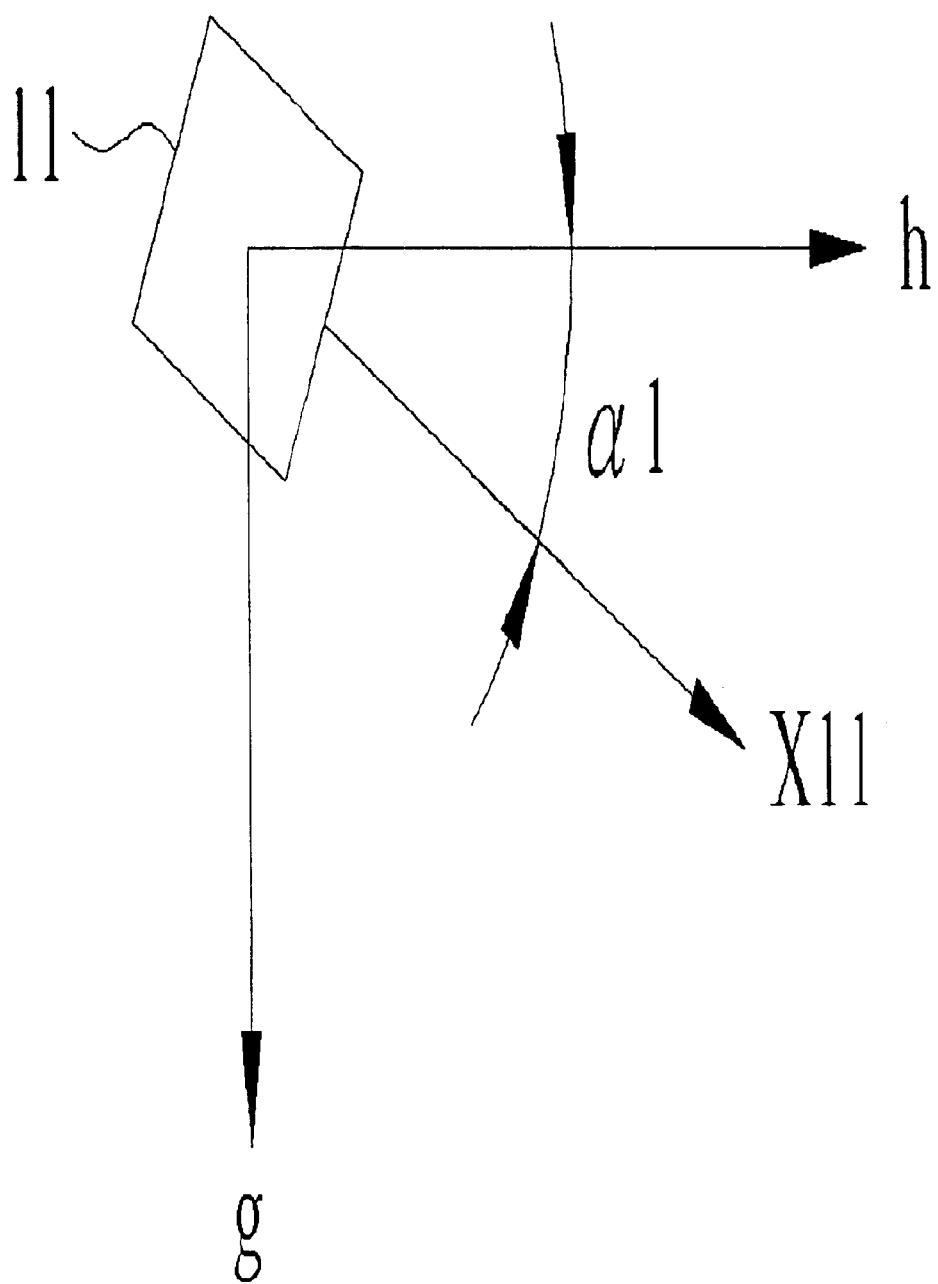
FIG. 1 is a block diagram of an accelerometer.
Figure 2:
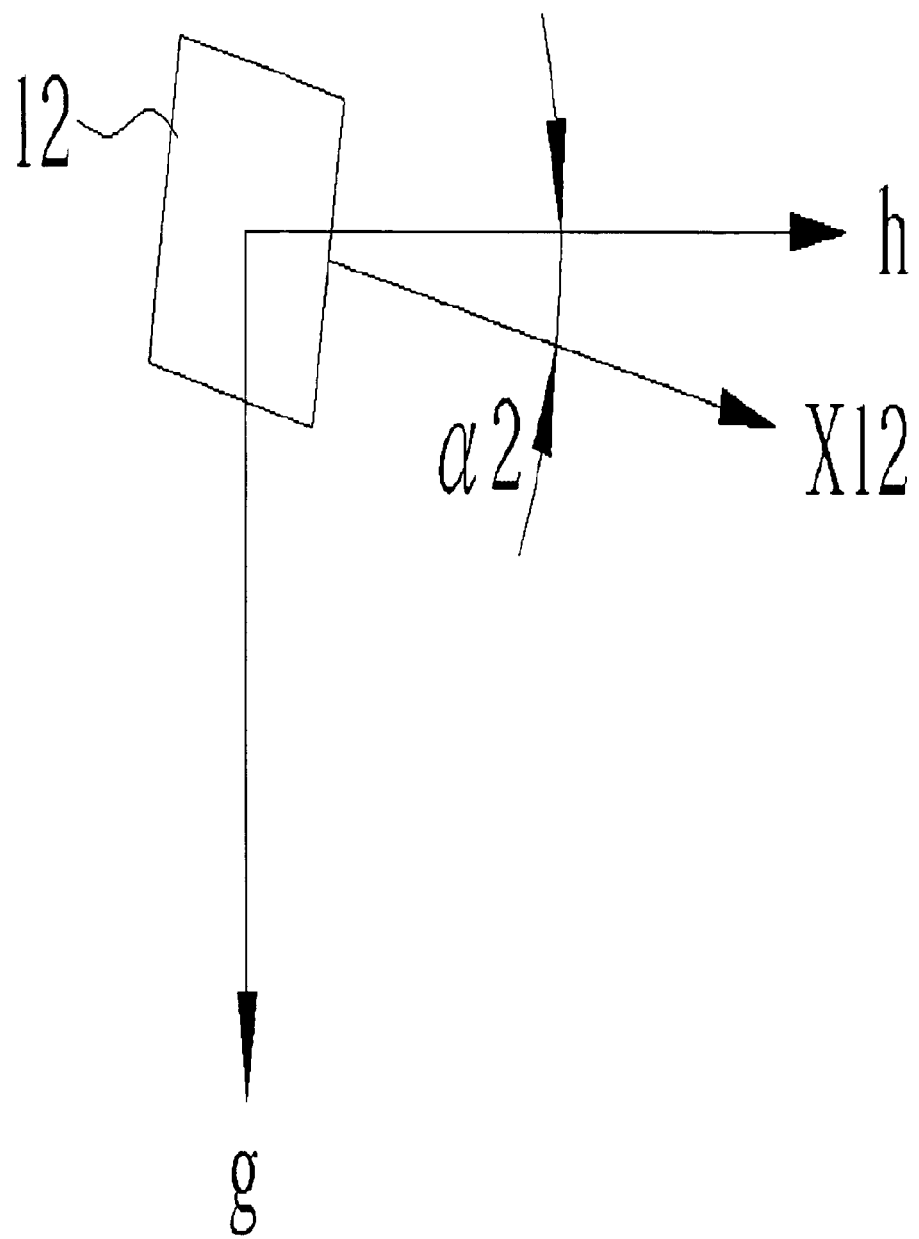
FIG. 2 is a block diagram of another accelerometer.

In this invention, each of two accelerometers is utilized to measure a component of a force of gravity in the direction of its detecting axis to determine the included angle between the two accelerometers, and then to determine the included angle between the flats on which the two accelerometers are disposed. Each accelerometer has a fixed detecting axis and is capable of measuring the component of a force in the direction of the detecting axis to determine the fixed or variable acceleration in the direction of the detecting axis. Such an accelerometer is usually applied in experiments for testing the crashworthiness of motor vehicles. Please refer to FIG. 1 and FIG. 2. FIG. 1 and FIG. 2 are two block diagrams of accelerometers 11 and 12 respectively. The accelerometers 11, 12 are under the effect of the force of gravity acting in a direction g relative to a direction h of the horizontal. Accelerometers 11 and 12 have detecting axes in directions X11 and X12 respectively. Each accelerometer is capable of measuring a component of the force of gravity in the direction of its detecting axis to determine the included angle between its detecting axis and the horizontal h. However, the flat on which devices are to be disposed may not be parallel to the horizontal h, or the included angle between the flat and the horizontal h may be uncertain. Accordingly, two accelerometers must be disposed on the device to be verified and a reference flat, respectively. The difference between the measurements of the two accelerometers, α1 and α2, is used to determine whether the assembly of the device is successful.

Figure 3:
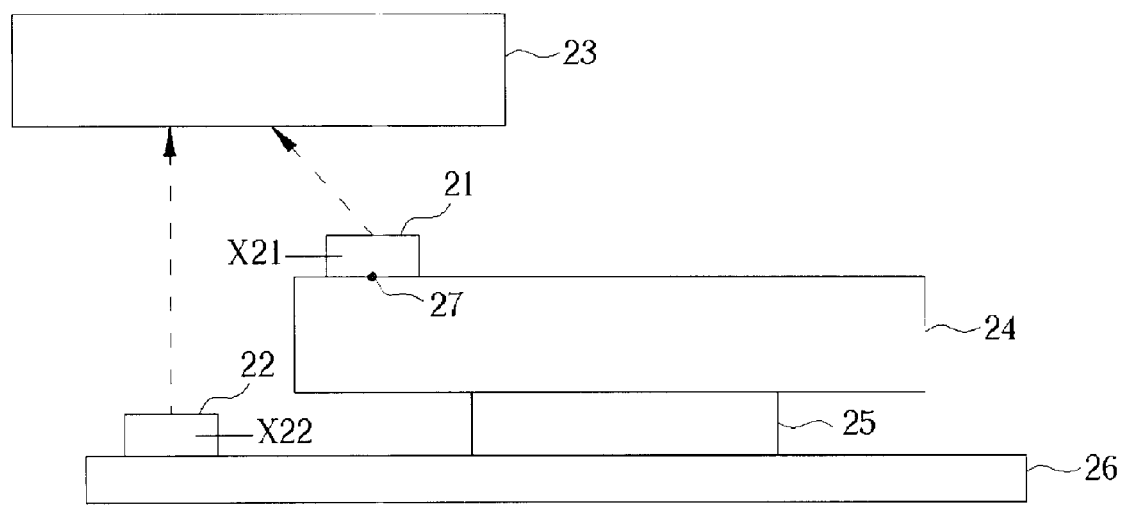
FIG. 3 is a block diagram of the first embodiment of the present invention verification system.

Please refer to FIG. 3. FIG. 3 is a block diagram of the first embodiment of the present invention verification system.

Figure 4:
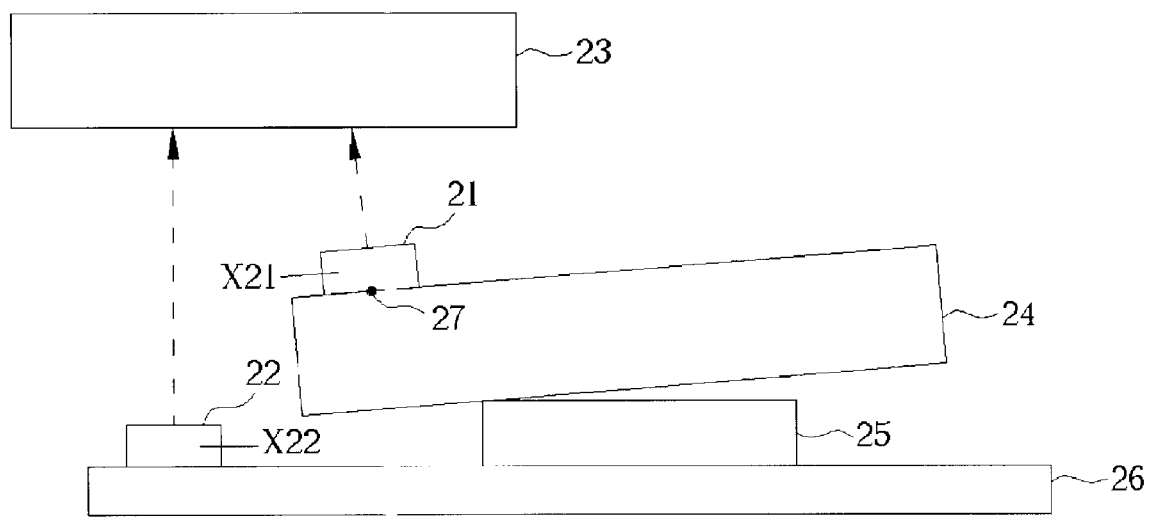
FIG. 4 is a block diagram of the first embodiment of the present invention verification system detecting unsuccessful assembly.

The verification system includes a first accelerometer 21, a second accelerometer 22, and a remote system 23 wirelessly connected to the two accelerometers 21 and 22 and capable of receiving the outputs of the two accelerometers. The first accelerometer 21 and the second accelerometer 22 have detecting axes X21 and X22 respectively. A heat sink 24 to be verified is disposed on a processor 25, and the processor 25 is disposed on a main board 26. When applying the verification system of the present invention to verify the assembly of the heat sink 24, the first accelerometer 21 is set up on a verification point 27 of the heat sink 24, and the second accelerometer 22 is set up on the upper surface of the main board 26. The accelerometers 21 and 22 measure the components of the force of gravity in the direction of the detecting axis X21 and the direction of the detecting axis X22 respectively, and transmit the measurements to the remote system 23. As illustrated in FIG. 3, the flat where the verification point 27 is located on and the upper surface of the main board 26 should be parallel to each other. Therefore, if the included angle between detecting axes X21 and X22 is determined to be zero, the remote system 23 determines that the assembly of the heat sink 24 is successful. Most of the time, a small deviation in the assembly of the devices is tolerable. For example it may be verified by experiment that an error within 5° is tolerable for the included angle between detecting axes X21 and X22. Then, if the included angle between detecting axes X21 and X22 is 3°, the remote system 23 still determines the assembly of the heat sink 24 to be successful. However, if the included angle between detecting axes X21 and X22 is greater than 5°, the remote system 23 determines the assembly of the heat sink 24 to be unsuccessful. As illustrated in FIG. 4, if the included angle between detecting axes X21 and X22 is greater than 5°, the remote system 23 determines the assembly of the heat sink 24 is unsuccessful suggesting that the heat sink 24 is likely not properly fit onto the processor 25. In the embodiment illustrated in FIG. 3, the remote system 23 is wirelessly connected to the two accelerometers. However, in other embodiments, the remote system 23 can be wire-connected to the two accelerometers.

Figure 5:
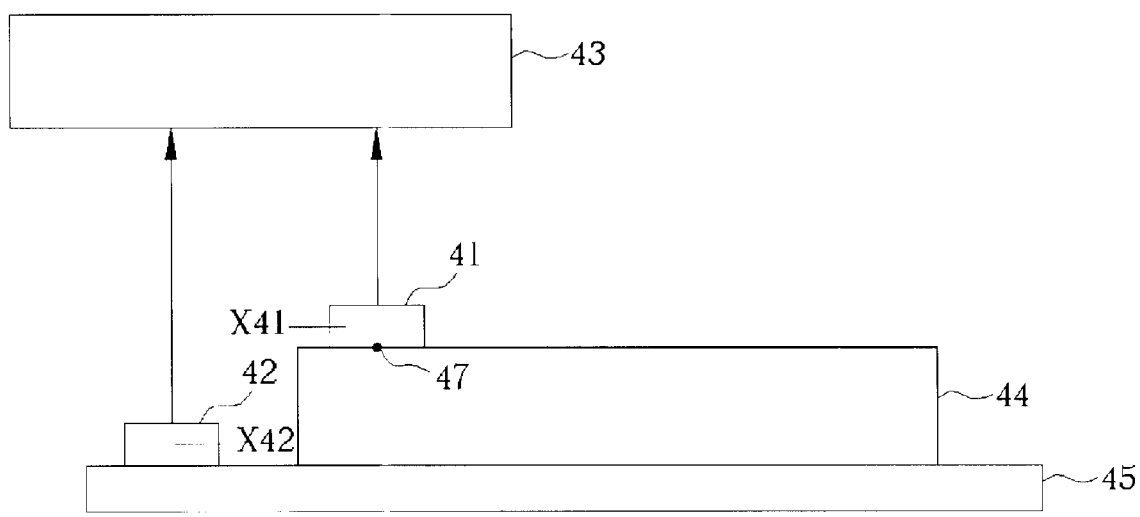
FIG. 5 is a block diagram of the second embodiment of the present invention verification system.

The verification system of the present invention can include functions of providing suggestions of calibration and re-verification after adjusting the assembly. Please refer to FIG. 5. FIG. 5 is a block diagram of the second embodiment of the present invention verification system. This verification system includes a first accelerometer 41, a second accelerometer 42, and a remote system 43 wire-connected to the two accelerometers and capable of receiving measurements from them. The first accelerometer 41 and the second accelerometer 42 have detecting axes X41 and X42 respectively. A heat sink 44 to be verified is disposed on a graphics chip 45. When applying the verification system of the present invention to verify the assembly of the heat sink 44, the first accelerometer 41 is set up on a verification point 47 of the heat sink 44, and the second accelerometer 42 is set up on the upper surface of the graphics chip 45. The accelerometers 41 and 42 measure the components of the force of gravity in the direction of the detecting axis X41 and the direction of the detecting axis X42 respectively, and transmit the measurements to the remote system 43. As illustrated in FIG. 5, the flat where the verification point 47 is located on and the upper surface of the graphics chip 45 should be parallel to each other. In this example, the predetermined tolerable error is 5°. If the included angle between detecting axes X41 and X42 is less than 5°, the remote system 43 determines the assembly of the heat sink 44 is successful. If the included angle between detecting axes X41 and X42 is greater than 5°, the remote system 43 not only determines the assembly of the heat sink 44 is unsuccessful, but also provides a suggestion about how to adjust the assembly of the heat sink 44, such as the direction and angle to adjust the assembly, according to the measurements of the accelerometers 41 and 42 transmitted to the remote system 43. After the adjustment, the accelerometers will measure the component of the force of gravity in the direction of the detecting axis X41 and the direction of the detecting axis X42 again and transfer the measurements to the remote system 43 to determine whether the assembly of the heat sink 44 is successful.

Figure 6:
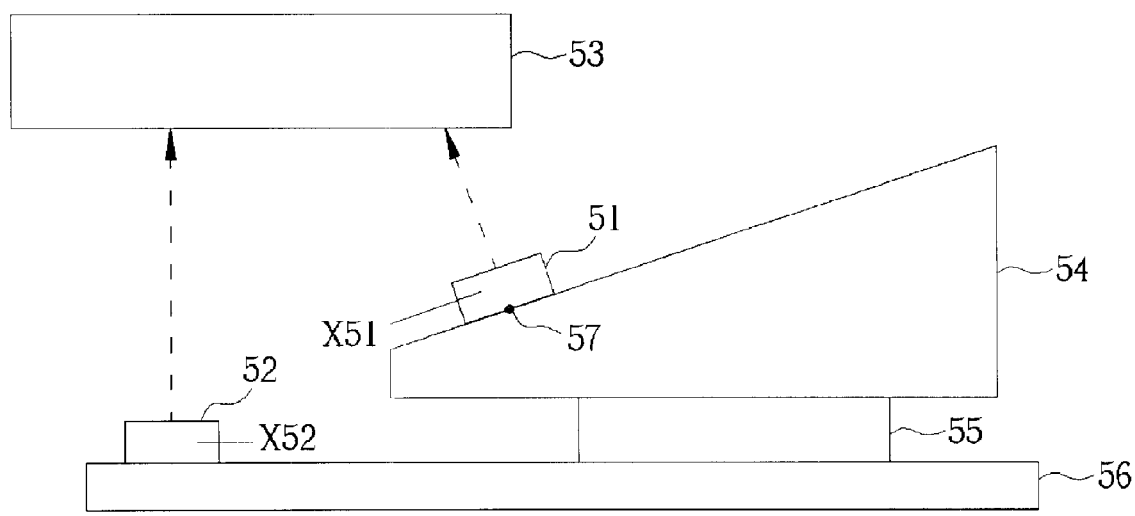
FIG. 6 is a block diagram of the third embodiment of the present invention verification system.

When the device to be verified and the reference flat are not parallel to each other, the present invention is still applicable. Please refer to FIG. 6. FIG. 6 is a block diagram of the third embodiment of the present invention verification system. This verification system includes a first accelerometer 51, a second accelerometer 52, and a remote system 53 wirelessly connected to the two accelerometers and capable of receiving the outputs of the two accelerometers. The first accelerometer 51 and the second accelerometer 52 have detecting axes X51 and X52 respectively. The heat sink 54, whose installation is to be verified, is disposed on a processor 55, and the processor 55 is disposed on a main board 56. When applying the verification system of the present invention to verify the assembly of the heat sink 54, the first accelerometer 51 is set up on a verification point 57 of the heat sink 54, and the second accelerometer 52 is set up on the upper surface of the main board 56. The accelerometers 51 and 52 measure the components of the force of gravity in the direction of the detecting axis X51 and the direction of the detecting axis X52 respectively, and transmit the measurements to the remote system 53. As illustrated in FIG. 6, there should be an included angle as great as 30° between the flat where the verification point 57 is located on and the upper surface of the main board 56. In this example, the predetermined tolerable error is ±5°. If the included angle between detecting axes X51 and X52 is greater than 25° and less than 35°, the remote system 53 determines the assembly of the heat sink 54 to be successful. If the included angle between detecting axes X51 and X52 is greater than 35° or less than 25°, the remote system 53 determines the assembly of the heat sink 54 to be unsuccessful.

Compared to the conventional technology, there are a lot of advantages of the present invention. First, the verification time is reduced dramatically. In the prior art, it usually takes several tens of minutes to perform the examining program, which is designed for the processor or the chipset to increase its operating temperature. In contrast, it only takes several seconds for the verification system of the present invention to measure the included angle between the two detecting axes of the two accelerometers. When verifying computers on a production line one by one, the time that the present invention can save is considerable. Second, in the verification method of the present invention, when the heat sink is designed to meet specification, only insuring that the performance of the heat sink is not affected by the assembly of the heat sink is required. Temperature does not need to be measured, hence the effect of the ambient temperature can be ignored. Third, as described in the second embodiment, the method of the present invention can include functions of providing suggestions of calibration and re-verification during assembly. Moreover, the present invention is not restricted to any specific operating system. It is not necessary to develop programs for the processor or the chipset to increase is operating temperature for different operating systems as in the conventional technology. The method of the present invention is not restricted in verification of thermal modules in computer systems. The present invention can be further applied to the assembly of different devices in different systems.

In summary, the present invention discloses a verification system and a related method for verifying the assembly of devices. The method includes utilizing accelerometers to measure the included angle between a device to be verified and a reference flat to determine whether the assembly of the device is successful. The present invention reduces the verification time, and sidesteps effect of ambient temperature. The present invention can be applied to all kinds of computer systems, and is capable of being further applied to verifying the assembly of different devices in different systems.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A verification system for verifying the assembly of a first device, the verification system comprising:

a first accelerometer disposed on a first flat; the first accelerometer having a first detecting axis and being capable of measuring a component of a force of gravity on the first accelerometer in the direction of the first detecting axis;

a second accelerometer disposed on a verification point of the first device; the second accelerometer having a second detecting axis and being capable of measuring a component of a force of gravity on the second accelerometer in the direction of the second detecting axis; and a remote system capable of comparing outputs of the two accelerometers to determine whether the assembly of the first device is successful.

2. The verification system of claim 1 wherein the remote system is wire-connected to the two accelerometers and receives the outputs of the two accelerometers.

3. The verification system of claim 1 wherein the remote system is wirelessly connected to the two accelerometers and receives the outputs of the two accelerometers.

4. The verification system of claim 1 wherein the first flat is an upper surface of a main board.

5. The verification system of claim 1 wherein the first flat is an upper surface of a chip.

6. The verification system of claim 1 wherein the first device is assembled on a second device, and the second device is assembled on the first flat.

7. The verification system of claim 6 wherein the first device is a heat sink.

8. The verification system of claim 6 wherein the second device is a processor.

9. The verification system of claim 6 wherein the second device is a chip.

10. A method for verifying whether the assembly of a first device is successful, the method comprising:

(a) disposing a first accelerometer on a verification point of the first device;

(b) disposing a second accelerometer on a first flat;

(c) measuring a component of a force of gravity on the first accelerometer in the direction of a detecting axis of the first accelerometer;

(d) measuring a component of a force of gravity on the second accelerometer in the direction of a detecting axis of the second accelerometer; and (e) determining whether the assembly of the first device is successful according to the measurements of the two accelerometers.

11. The method of claim 10 further comprising if in step (e) the assembly of the first device is determined unsuccessful, adjusting the position of the first device according to the measurements of the two accelerometers and executing step (c), (d), and (e) again.

12. The method of claim 10 wherein step (e) further comprises determining an included angle between the first device and the first flat according to the measurements of the two accelerometers, and determining the assembly of the first device is successful if the included angle between the first device and the first flat is within a predetermined range.

13. The method of claim 10 further comprising assembling the first device on the first flat.

14. The method of claim 10 further comprising assembling a second device on the first flat, and assembling the first device on the second device.

* * * * *